United States Patent
Tomizawa

(10) Patent No.: US 9,423,267 B2
(45) Date of Patent: Aug. 23, 2016

(54) NAVIGATION DEVICE AND DISPLAY CONTROL METHOD

(71) Applicant: JVC KENWOOD Corporation, Yokohama-shi, Kanagawa (JP)

(72) Inventor: Katsumi Tomizawa, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 138 days.

(21) Appl. No.: 14/231,800

(22) Filed: Apr. 1, 2014

(65) Prior Publication Data

US 2014/0297174 A1  Oct. 2, 2014

(30) Foreign Application Priority Data

Apr. 2, 2013 (JP) ................................. 2013-076845

(51) Int. Cl.
*G01C 21/36* (2006.01)

(52) U.S. Cl.
CPC .................................. *G01C 21/365* (2013.01)

(58) Field of Classification Search
CPC .. G03B 5/00; B60K 35/00; B60K 2350/2052; G02B 27/017; G02B 27/01; G02B 27/64; G02B 2027/0138; G02B 2027/0187; G02B 2027/014

See application file for complete search history.

(56) References Cited

U.S. PATENT DOCUMENTS

| 2003/0176966 A1* | 9/2003 | Yamashita | G06T 15/00 701/436 |
| 2005/0093719 A1* | 5/2005 | Okamoto | G01C 21/365 340/995.1 |
| 2012/0050138 A1* | 3/2012 | Sato | B60K 35/00 345/4 |
| 2012/0174004 A1* | 7/2012 | Seder | G02B 27/01 715/764 |

FOREIGN PATENT DOCUMENTS

JP  2000-112343 A  4/2000

* cited by examiner

*Primary Examiner* — John Q Nguyen
*Assistant Examiner* — Jordan S Fei
(74) *Attorney, Agent, or Firm* — Nath, Goldberg & Meyer; Jerald L. Meyer

(57) ABSTRACT

A position detector is configured to detect a current position of a moving body. A condition detector is configured to detect moving conditions including a forward direction of the moving body. A display unit is configured to display a predetermined image overlaid on the landscape in front of the moving body. A storage unit is configured to store the position of each intersection in a route along which the moving body moves and the position and shape of each object existing around the intersection. A selector is configured to select any one of the objects existing around an intersection for which guidance is needed when the moving body nears the intersection. A drawing controller is configured to draw on the display unit, a guide figure indicating the object selected by the selector.

5 Claims, 14 Drawing Sheets

NAVIGATION DEVICE AND DISPLAY CONTROL METHOD

CROSS REFERENCE TO RELATED APPLICATION

This application is based upon and claims the benefit of priority under 35 U.S.C. §119 from Japanese Patent Application No. 2013-076845, filed on Apr. 2, 2013, the entire contents of which are incorporated herein by reference.

BACKGROUND

The present disclosure relates to a navigation device and a display control method.

Navigation devices mounted on vehicles including automobiles are widespread. The navigation devices retrieve a navigation route to an arbitrarily set destination from map information (route information and the like), for example.

A navigation device successively detects the current position of a moving vehicle in which the navigation device is mounted (an equipped vehicle) and guides the driver to the destination by displaying an informative image showing the direction of turn or the like before the equipped vehicle reaches an intersection (a crossroads or the like) for which guidance is needed along the navigation route.

As a prior technique of such navigation devices, Japanese Patent Laid-open Publication No. 2000-112343 (Patent Literature 1) discloses a technique to stereoscopically display surrounding buildings and the like with easy visualization at an intersection for which guidance is needed.

SUMMARY

However, the technique of Patent Literature 1 is to stereoscopically display buildings and the like on a normal display of the navigation device.

The driver therefore needs to identify the suggested intersection by looking at the displayed contents and then match the displayed contents to the landscape that the driver is actually seeing (actual positions of buildings and the like).

Accordingly, misreading, misunderstanding, and the like are likely to occur, and the driver sometimes turns right or left at a different intersection from the suggested intersection.

An object of the embodiments is to provide a navigation device capable of properly showing an intersection for which guidance is needed and provide a display control method thereof.

A first aspect of the embodiments provide a navigation device comprising: a position detector configured to detect a current position of a moving body; a condition detector configured to detect moving conditions including a forward direction of the moving body; a display unit configured to display a predetermined image overlaid on the landscape in front of the moving body; a storage unit configured to store the position of each intersection in a route along which the moving body moves and the position and shape of each object existing around the intersection; a selector configured to select any one of the objects existing around an intersection for which guidance is needed when the moving body nears the intersection; and a drawing controller configured to draw on the display unit, a guide figure indicating the object selected by the selector.

A second aspect of the embodiments provide a navigation device comprising: a position detector configured to detect a current position of a moving body; a display unit configured to display a predetermined image overlaid on the landscape in front of the moving body; a photographing unit configured to take an image of the landscape in front of the moving body; a selector configured to select a lane that the moving body is to travel in a route included in the image of the landscape photographed by the photographing unit when the moving body nears an intersection for which guidance is needed; and a drawing controller configured to draw on the display unit, a guide figure indicating the lane selected by the selector.

A third aspect of the embodiments provide a display control method, comprising: detecting a current position of a moving body; detecting moving conditions including a forward direction of the moving body; selecting any one of objects existing around an intersection for which guidance is needed when the moving body nears the intersection; and drawing a guide figure indicating the selected object on a display unit so that the guide figure is overlaid on the landscape in front of the moving body.

A fourth aspect of the embodiments provide a display control method, comprising: detecting a current position of a moving body; taking an image of the landscape in front of the moving body; selecting a lane that the moving body is to travel in a route included in the taken image of the landscape when the moving body nears an intersection for which guidance is needed; and drawing a guide figure indicating the selected lane on a display unit so that the guide figure is overlaid on the landscape in front of the moving body.

BRIEF DESCRIPTION OF THE DRAWINGS

FIG. 5A is a schematic view for explaining a facility which serves as a reference point and the like.

DETAILED DESCRIPTION

Navigation devices of the embodiments will be described below with reference to the drawings. The navigation devices described below are mounted on right-hand drive vehicles (automobiles and the like) by way of example.

Hereinafter, vehicles in which the navigation devices are mounted are referred to as equipped vehicles. The equipped vehicles are not limited to right-hand drive vehicles and may be left-hand drive vehicles as described later. Moreover, the navigation devices can be mounted not only on the vehicles but also on other moving bodies as described later.

First Embodiment

Figure 1:
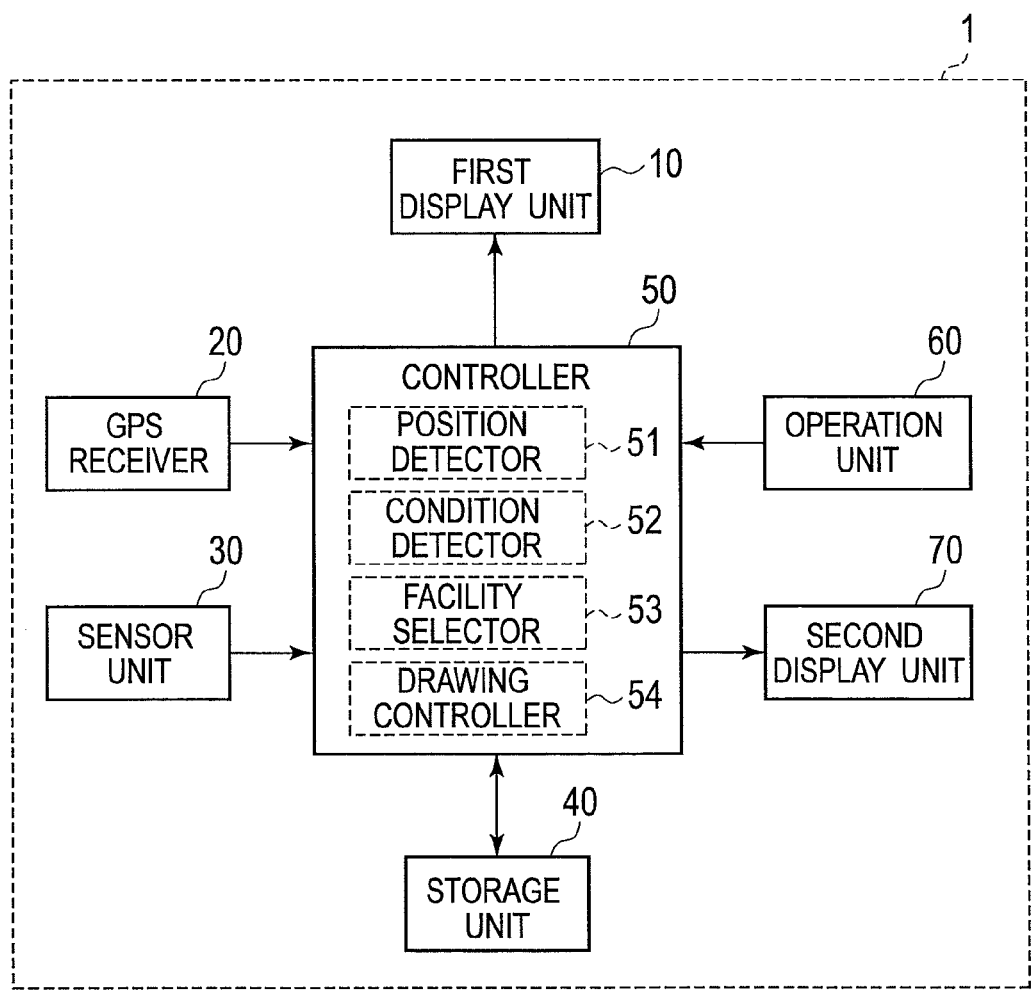
FIG. 1 is a block diagram illustrating a configuration example of a navigation device according to a first embodiment.

FIG. 1 is a block diagram illustrating a configuration example of a navigation device 1 according to a first embodiment.

As illustrated in the drawing, the navigation device 1 includes a first display unit 10, a GPS (global positioning system) receiver 20, a sensor unit 30, a storage unit 40, a controller 50, an operation unit 60, and a second display unit 70.

The first display unit 10 is composed of a head-up display (HUD), for example, and is configured to display a predetermined image overlaid on the landscape that the driver of the equipped vehicle is seeing.

Figure 2:
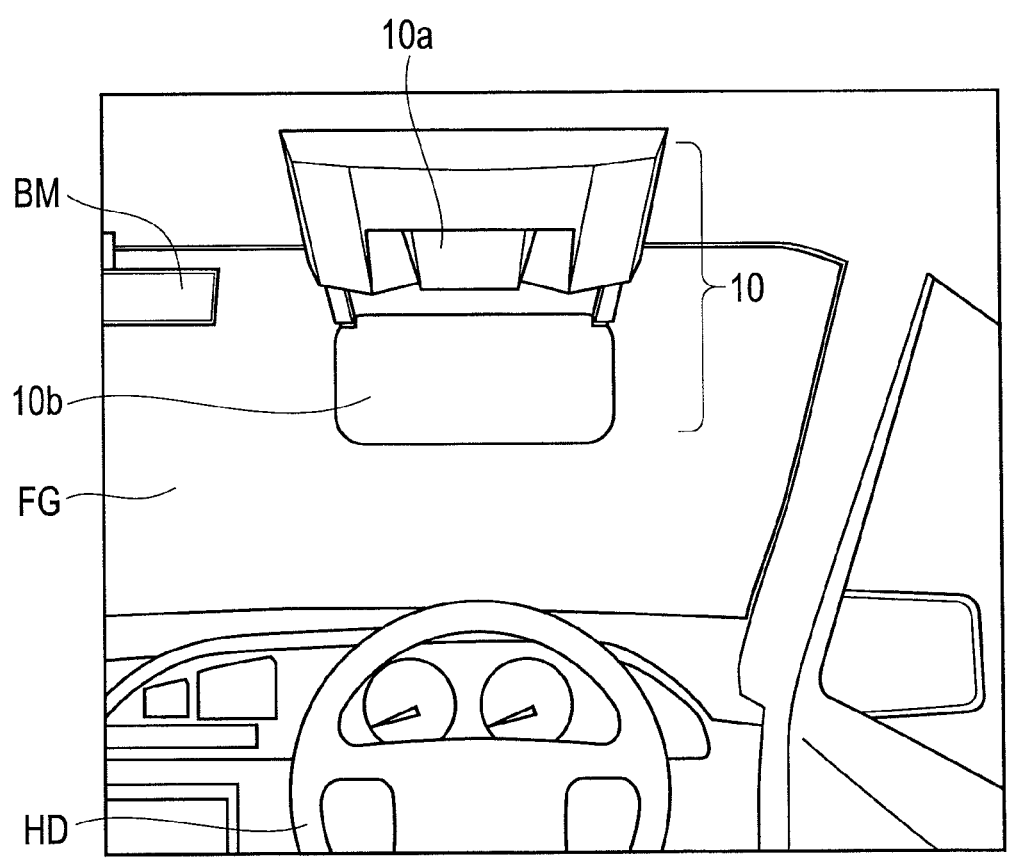
FIG. 2 is a schematic view for explaining a concrete installation place of a first display unit.

Specifically, the first display unit 10 is composed of a head-up display including a projector 10a and a combiner 10b as illustrated in FIG. 2.

The body (the projector 10a or the like) of the first display unit 10 is fixed on the ceiling above a steering wheel HD in the equipped vehicle, and the combiner 10b is provided in the vicinity of a windshield FG in a similar manner to a rearview mirror BM.

The attachment position of the first display unit 10 is not limited to the ceiling and can be properly changed. The first display unit 10 may be attached to the rearview mirror BM, for example.

Figure 3A:
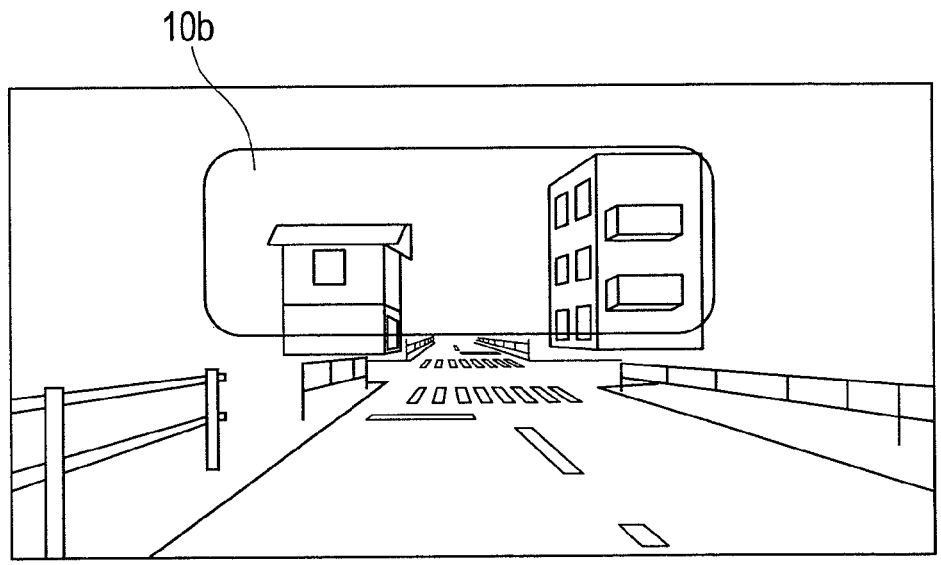
FIG. 3A is a schematic view for explaining that a combiner is held in a driver's field of vision.

As illustrated in FIG. 3A, the first display unit 10 is adjusted and located so that the combiner 10b is held at the upper center in the field of vision of the driver who is looking at the front.

Figure 3B:
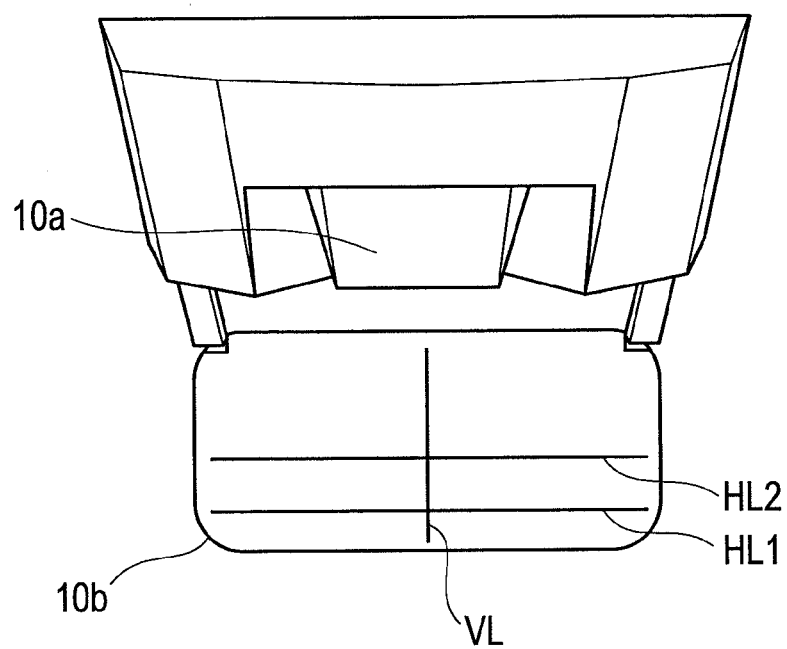
FIG. 3B is a schematic view illustrating an example of reference lines projected on the combiner in the process of adjusting the first display unit.

In the process of adjusting the first display unit 10 (for attachment or the like), for example, the projector 10a projects reference lines VL, HL1, and HL2 onto the combiner 10b as illustrated in FIG. 3B. The reference line VL defines the central vertical line. The reference line HL1 defines a horizontal line 10 m ahead, and the reference line HL2 defines a horizontal line 100 m ahead.

The height, horizontal position, angle, and depth of the first display unit 10 are adjusted so that the landscape seen from the driver through the combiner 10b corresponds to these reference lines VL, HL1, and HL2.

The combiner 10b is therefore held at a position not excessively high so that an object such as a facility serving as a reference point can be seen through the combiner 10b before the vehicle reaches the intersection for which the guidance is needed (a crossroads or the like) as described later.

The combiner 10b located in the driver's field of vision is composed of a half mirror, a HOE (holographic optical element), or the like, for example. The combiner 10b transmits part of external light while reflecting light rays (an image) projected by the projector 10a.

The first display unit 10 can overlay the created image on the landscape at which the driver is looking.

The image displayed on the combiner 10b is described in detail together with the later described controller 50 (a drawing controller 54).

Back to FIG. 1, the GPS receiver 20 is configured to receive satellite radio waves emitted from GPS satellites above. The GPS receiver 20 acquires a plurality of GPS satellites, successively receives satellite radio waves transmitted from the GPS satellites, and supplies GPS signals based on the received radio waves to the controller 50, for example.

The sensor unit 30 is composed of a vehicle speed sensor, an acceleration sensor, a gyro sensor, and the like, for example. The sensor unit 30 is configured to successively generate information indicating the speed, acceleration, direction (azimuth direction), and the like of the equipped vehicle and supplies the generated information to the controller 50.

The storage unit 40 is composed of a hard disk, a DVD, or the like and stores map information, image information, and the like in advance.

The map information includes road network information composed of road links, road nodes, and the like, for example.

Each road link is information of a predetermined section constituting each road and is composed of the position coordinates (latitude, longitude, altitude, etc.), distance, amount of time required, road width, number of lanes, and speed limit, and the like, for example. Each road node is information specifying an intersection (a crossroads or the like) and is composed of the position coordinates, connected road links, and the like, for example.

The map information includes information of objects stood around each intersection. The objects include artificial structures, natural items (a tree serving as a landmark or the like), and icons (rivers, lakes, and the like) of natural items (landmarks).

The artificial structures typically include various facilities (including buildings such as houses and apartment buildings, gas stations, parks, and TV towers, for example).

The object information includes position coordinates and stereoscopic profile (dimensions of height, width, and depth for specifying the stereoscopic exterior profile, positions, and the like), for example. Hereinafter, the following description is given using a facility as an example of the object information.

The image information includes data of map images and various types of symbols.

The controller 50 is composed of a microcomputer including a ROM (read-only memory), a RAM (random access memory), and a CPU (central processing unit), and the like and is configured to control the entire navigation device 1.

Specifically, the CPU reads programs stored in the ROM to cause the controller 50 to function as a position detector 51, a condition detector 52, a selector (facility selector) 53 selecting an object, and the drawing controller 54.

When a desired destination is set by the operation unit 60 described later, the controller 50 searches for a navigation route using the road network information (road links, road nodes, and the like) of the storage unit 40. The navigation route that the equipped vehicle is to travel is selected and is stored in the storage unit 40.

The position detector 51 is configured to detect (estimate) the current position of the equipped vehicle based on the satellite radio waves received by the GPS receiver 20. For example, the position detector 51 measures the position of the equipped vehicle based on the radio waves from a plurality of satellites (at least three) and detects positional information composed of latitude, longitude, and altitude.

When the GPS receiver 20 cannot receive the satellite radio waves, such as when the equipped vehicle is traveling within a tunnel, the position detector 51 detects the current position by autonomous navigation using information acquired from the sensor unit 30 and the like.

The condition detector 52 is configured to detect the traveling condition including the forward direction of the equipped vehicle based on the information acquired from the sensor unit 30. To be specific, the condition detector 52 detects the current traveling condition including the moving direction (the forward direction of the equipped vehicle) based on speed information, acceleration information, and direction (azimuth direction) information sequentially acquired.

The selector 53 configured to select an object typically serves as a facility selector. Hereinafter, the selector is described as the facility selector 53.

When the equipped vehicle nears along the aforementioned navigation route an intersection for which guidance is needed, that is, an intersection at which the vehicle needs to turn right or left or a fork at which the equipped vehicle needs to deviate to the right or left, the facility selector 53 selects a facility as a reference point from facilities around the intersection.

Figure 4:
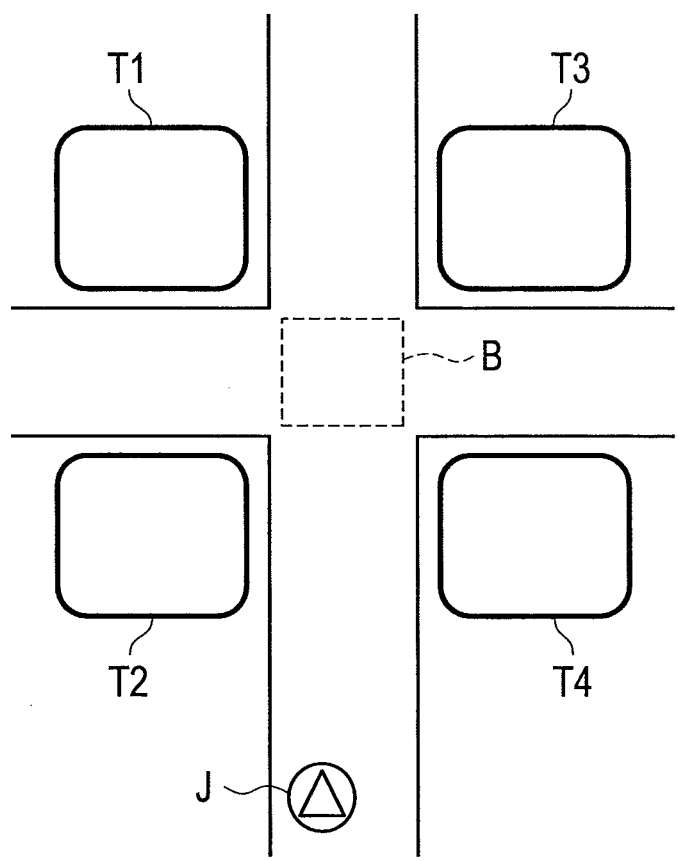
FIG. 4 is a schematic view for explaining an arrangement of facilities existing around an intersection.

Specifically, when an equipped vehicle J nears an intersection B for which guidance is needed as illustrated in FIG. 4, the facility selector 53 reads the facility information of facilities T1 to T4 (four facilities in this example) existing around the intersection B from the storage unit 40.

The facility selector 53 selects one facility based on the positional relationship between the facilities T1 to T4 and the equipped vehicle J. The facilities are prioritized based on the positions in the order of: the far left corner, near left corner, far right corner, and near right corner with respect to the position of the equipped vehicle J (in descending order of priorities), for example.

This is because the user can understand the guidance to turn before a facility more easily than the guidance to turn after passing by the facility. Moreover, in the case of a right-hand drive vehicle, the driver can recognize more easily the left side of the landscape, which is closer to the center of the front of the vehicle.

Accordingly, the facility selector 53 selects the facility T1, which is located on the far left corner and is of the highest priority, in the case of the example of FIG. 4. The facility selector 53 selects a facility of higher priority based on the existence of each facility at the intersection: when the facility T1 does not exist, the facility selector 53 selects the facility T2, which is of the second highest priority.

FIG. 4 shows an example of a crossroads at which two roads intersect (a four-way intersection). Moreover, the facilities are similarly prioritized for a three-way intersection such as a Y-junction or a T-junction or a multiple-way intersection at which three or more roads intersect (a five-way intersection or more).

These priorities are shown by way of example for right-hand drive vehicles. In the case of left-hand drive vehicles, the facilities may be prioritized in a different manner as described later. Moreover, the priorities may be changed depending on the direction of turn (deviation).

The drawing controller 54 is configured to create a guide figure indicating the facility serving as the reference point and draw the same on the first display unit 10.

The drawing controller 54 creates a guide figure for identifying the facility serving as the reference point, based on the position and forward direction of the equipped vehicle and the position and shape of the facility selected by the facility selector 53. The drawing controller 54 then draws the created guide figure at a corresponding position on the combiner 10*b* so that the driver can see the guide figure on the facility.

For example, the drawing controller 54 calculates the profile shape and size of the facility when seen from the equipped vehicle based on the positional relationship between the equipped vehicle and the facility serving as the reference point and the directions thereof and creates a guide figure based on the calculated shape and size.

The drawing controller 54 draws the created guide figure at the corresponding position on the combiner 10*b* where the facility is seen from the equipped vehicle. The apparent size of the facility changes as the equipped vehicle travels. Accordingly, the drawing controller 54 draws the guide figure so as to keep up with the change in apparent size.
0055
In this process, the drawing controller 54 draws the guide figure at the corresponding position of the combiner 10*b* so that the difference in altitude between the equipped vehicle and the position of the intersection is properly eliminated as described later.

The drawing controller 54 creates a direction symbol indicating the direction that the equipped vehicle needs to turn (deviate) at the intersection of interest and draws the same on the combiner 10*b*.

Figure 5A:
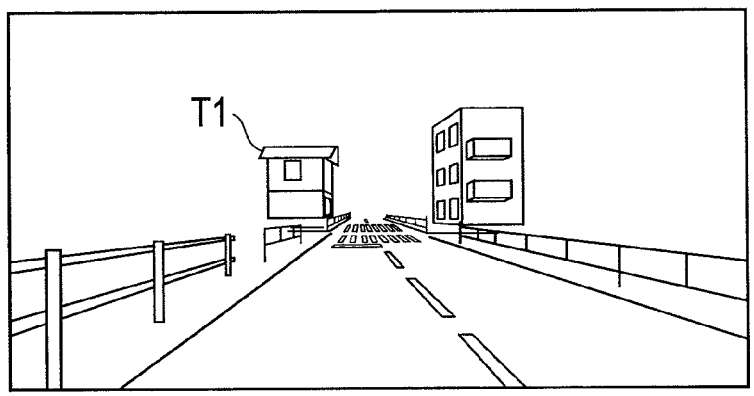
Figure 5B:
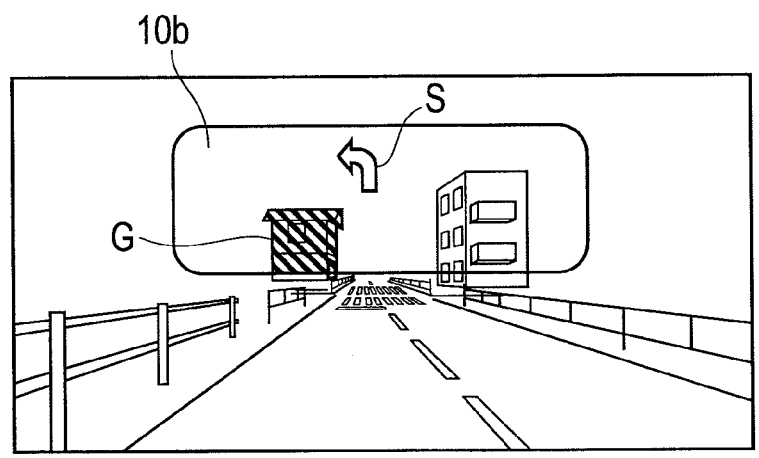
FIGS. 5B and 5C are schematic views for explaining a guide figure, a direction symbol, and the like which are drawn on the combiner.

Specifically, when the facility T1 (more specifically, facility information corresponding to the facility T1) as illustrated in FIG. 5A is selected as the reference point, the drawing controller 54 projects the guide figure G onto the combiner 10*b* as illustrated in FIG. 5B.

The guide figure G hatched with diagonal lines in FIG. 5B shows that the guide figure G is actually drawn in a predetermined translucent color (yellow, for example).

The guide figure G is created to have the same profile shape as that of the facility T1 seen from the equipped vehicle and have a size corresponding to the distance to the facility T1. The created guide figure G is drawn at such a position that the guide figure G is overlaid on the facility T1 seen from the equipped vehicle through the combiner 10*b*.

The driver can therefore directly recognize the facility serving as the reference point based on the guide figure G and the view of the facility seen through the guide figure G.

The drawing controller 54 creates a direction symbol S (a left-turn direction symbol in the case of this example) indicating the direction of turn (deviation) to have a size corresponding to the distance to the intersection. The drawing controller 54 then draws the created direction symbol S on the combiner 10*b*.

Figure 5C:
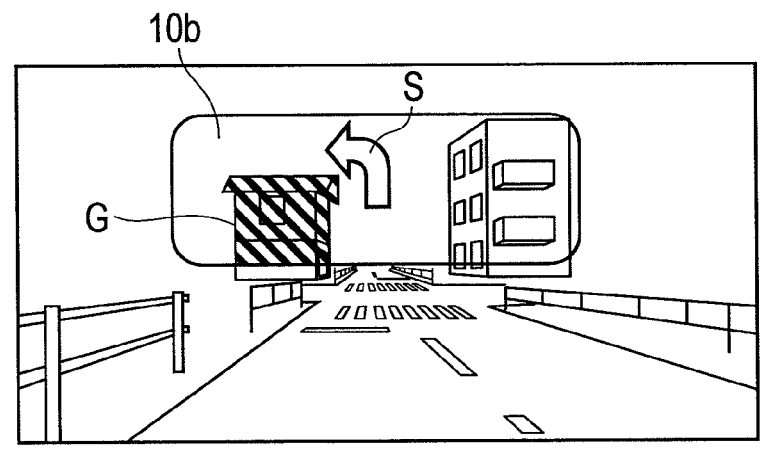

As the equipped vehicle nears the intersection, the drawn guide figure G and direction symbol S enlarges as illustrated in FIG. 5C.

Accordingly, the driver can easily know the suggested intersection (the crossroads in front of the driver in the case of this example) and the direction of turn (left turn in the case of this example) based on the guide figure G and direction symbol S drawn on the combiner 10*b*.

Back to FIG. 1, the operation unit 60 is composed of buttons provided on the body of the navigation device 1 and the like, for example, and is configured to accept various operations by the driver. The operation unit 60 may be composed of a touch panel provided in the front surface of the second display unit 70 described later, an infrared remote controller, or the like.

The second display unit 70 is composed of a liquid crystal display or the like, for example, and is configured to display a navigation image in which the current position of the equipped vehicle is marked on the map image.

The operations of the navigation device 1 thus configured are described below with reference to the drawings. In the description of the following operation, it is assumed that the navigation route to a destination set by the driver or the like has been already retrieved and the information specifying the navigation route is stored in the storage unit 40.

Figure 6:
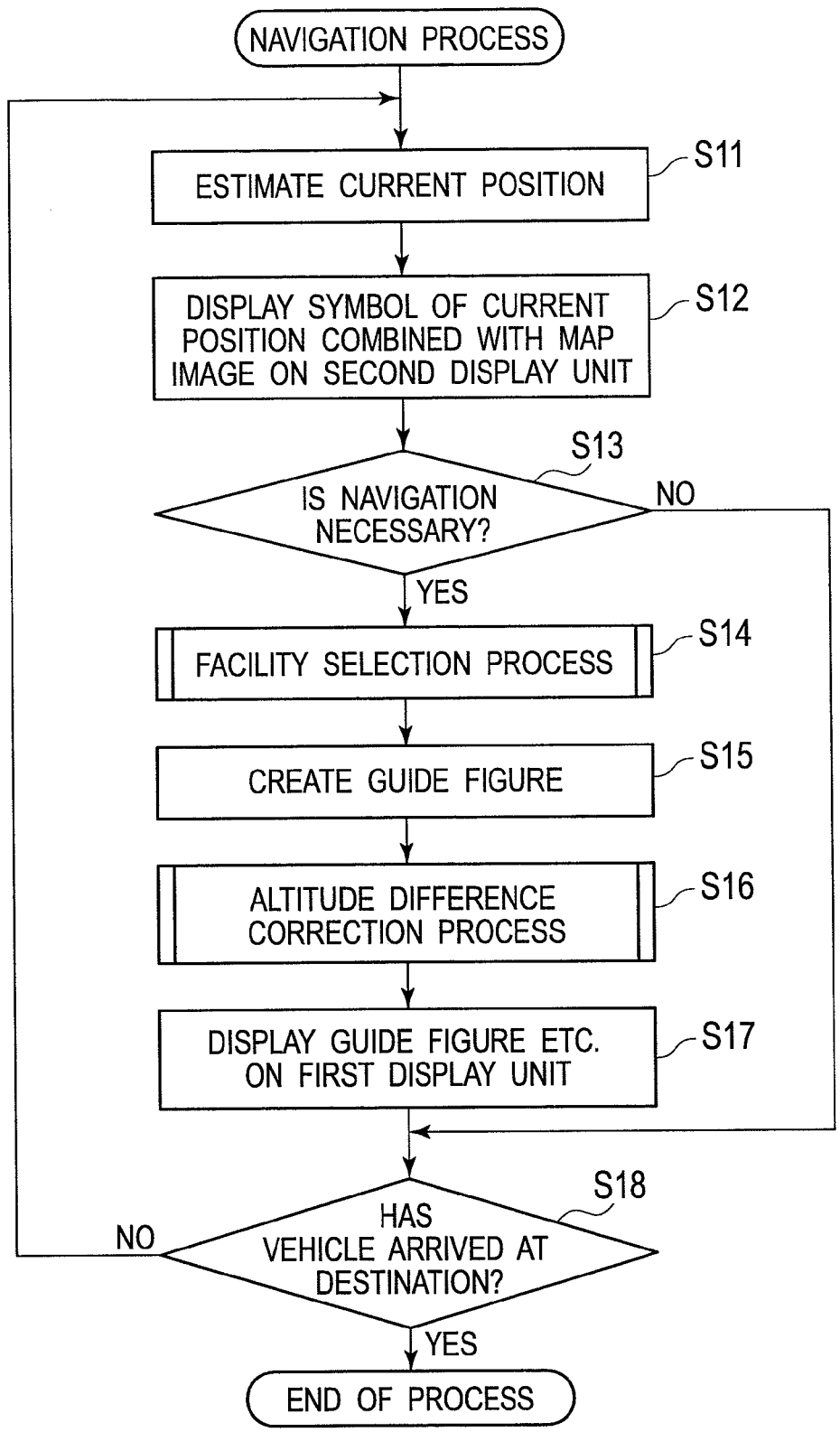
FIG. 6 is a flowchart showing a navigation process according to the first embodiment by way of example.
Figure 7:
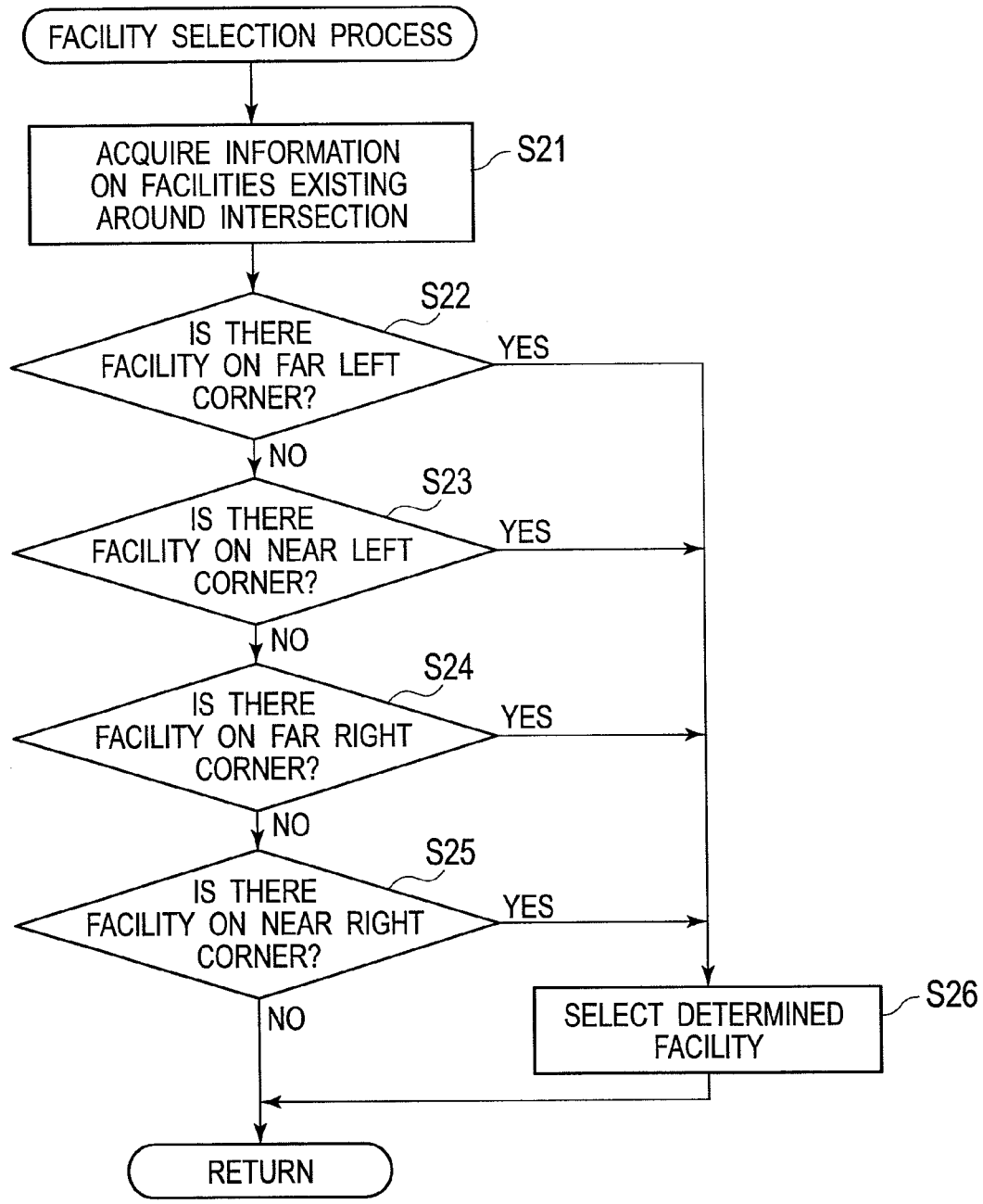
FIG. 7 is a flowchart showing the details of a facility selection process by way of example.
Figure 8:
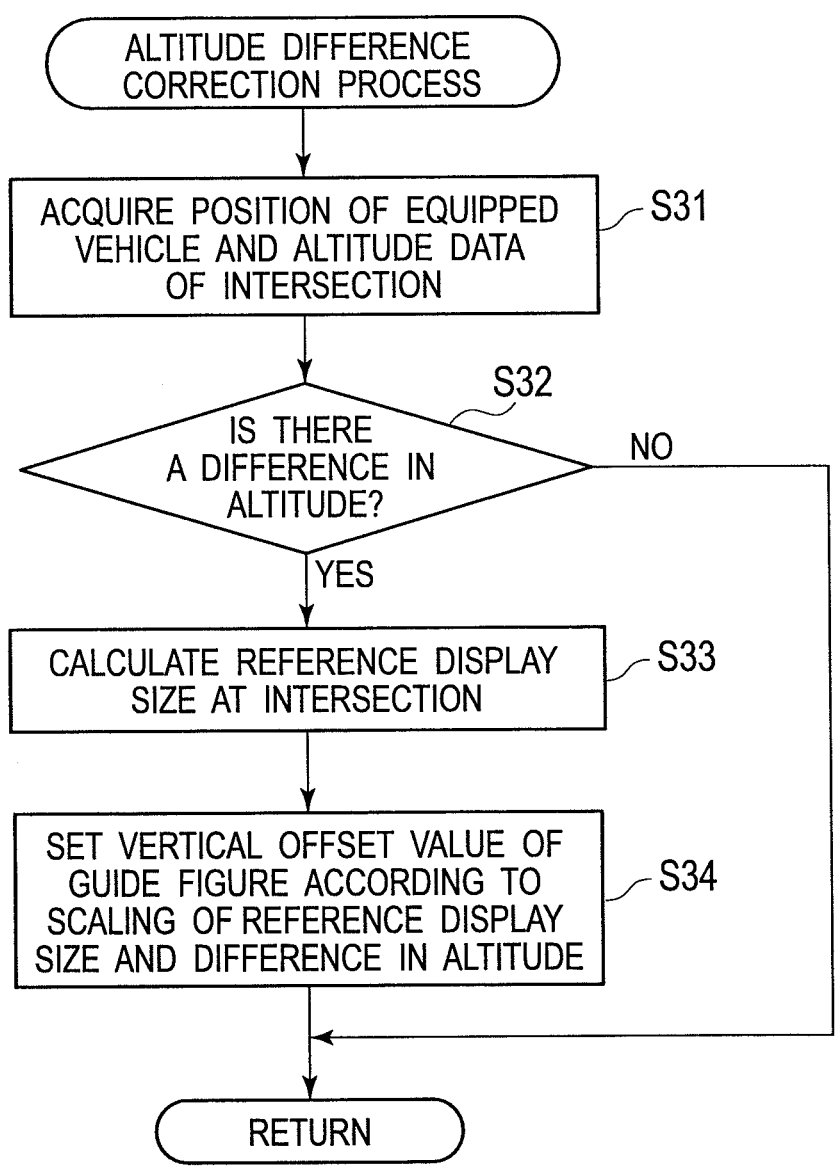
FIG. 8 is a flowchart showing the details of an altitude difference correction process by way of example.

FIG. 6 is a flowchart for explaining a navigation process executed by the navigation device 1. FIG. 7 is a flowchart showing the details of a facility selection process (subroutine). FIG. 8 is a flowchart showing the details of an altitude difference correction process (subroutine). The operation of the navigation device 1 is described with reference to the flowcharts of FIGS. 6 to 8 below.

First, in the navigation process of FIG. 6, the navigation device 1 estimates the current position (step S11).

The position detector 51 detects the current position of the equipped vehicle based on the satellite radio waves received by the GPS receiver 20. When the GPS receiver 20 cannot receive the satellite radio waves, such as when the equipped vehicle is traveling in a tunnel, the position detector 51 detects the current position by autonomous navigation using information obtained from the sensor unit 30 and the like.

The navigation device 1 combines a symbol indicating the current position with the map image and displays the same on the second display unit 70 (step S12). In other words, the navigation device 1 displays a normal navigation image on the second display unit 70 composed of a liquid crystal display or the like.

The navigation device 1 determines whether navigation is necessary (step S13). The controller 50 determines whether the equipped vehicle is near the intersection for which guidance is needed based on the current position of the equipped vehicle and the retrieved navigation route.

If the navigation device 1 determines that navigation is not necessary (step S13; NO), the navigation device 1 proceeds to step S18 described later.

On the other hand, if the navigation device 1 determines that navigation is necessary (step S13; YES), the navigation device 1 performs the facility selection process (step S14).

The details of the facility selection process are described with reference to FIG. 7 below.

In the facility selection process of FIG. 7, the navigation device 1 acquires information of the facilities existing around the intersection (step S21).

The facility selector 53 reads from the storage unit 40, the facility information on each facility located around the intersection for which guidance is needed.

The facility selector 53 determines based on the current position of the equipped vehicle and the read facility information whether there is a facility on the far left corner of the intersection with respect to the equipped vehicle (step S22). When determining that there is a facility on the far left corner (step S22; Yes), the facility selector 53 proceeds to step S26 described later.

When determining that there is no facility on the far left corner (step S22; No), the facility selector 53 determines whether there is a facility on the near left corner of the intersection with respect to the equipped vehicle (step S23). When determining that there is a facility on the near left corner (step S23; Yes), the facility selector 53 proceeds to the step 26 described later.

When determining that there is no facility on the near left corner (step S23; No), the facility selector 53 determines whether there is a facility on the far right corner of the intersection with respect to the equipped vehicle (step S24). When determining that there is a facility on the far right corner (step S24; Yes), the facility selector 53 proceeds to the step 26 described later.

When determining that there is no facility on the far right corner (step S24; No), the facility selector 53 determines whether there is a facility on the near right corner of the intersection with respect to the equipped vehicle (step S25). When determining that there is a facility on the near right corner (step S25; Yes), the facility selector 53 proceeds to the step 26 described later.

The facility selector 53 selects the facility which is determined to exist by any one of the steps S22 to S25 (step S26). The facility selector 53 then terminates the facility selection process.

When determining that there is no facility on the near right corner (step S25; No), the facility selector 53 terminates the facility selection process without selecting a facility. Such operation not selecting a facility is an exception, and the facility selector 53 normally selects a facility.

The above operation is performed for the crossroads at which two roads intersect. In the case of a Y-junction or an intersection at which three or more roads intersect, facilities are properly prioritized, and the facility selector 53 selects a facility of a higher priority corresponding to each intersection for which guidance is needed.

Back to FIG. 6, the navigation device 1 creates a guide figure (step S15).

The drawing controller 54 creates a guide figure indicating the facility serving as the reference point based on the position and direction of the equipped vehicle and the position and shape of the facility selected in the above-described facility selection process.

For example, the drawing controller 54 calculates the profile shape and size of the facility seen from the equipped vehicle based on the positional relationship between the equipped vehicle and the selected facility and the relationship between the forward directions of the same. The drawing controller 54 then creates a guide figure based on the calculated shape and size.

The navigation device 1 performs the altitude difference correction process (step S16).

The details of the altitude difference correction process are described with reference to FIG. 8 below.

In the altitude difference correction process of FIG. 8, the navigation device 1 acquires the position of the equipped vehicle and altitude data of the intersection (step S31).

The drawing controller 54 reads from the storage unit 40, information on the altitude of the position of the equipped vehicle and the information on the altitude of the position of the intersection.

The drawing controller 54 determines whether there is a difference in altitude (step S32). The drawing controller 54 determines whether the difference in altitude between the equipped vehicle and the intersection is larger than a predetermined value, for example.

When determining that there is no difference in altitude (step S32; No), the drawing controller 54 terminates the altitude difference correction process.

When determining that there is a difference in altitude (step S32; Yes), the drawing controller 54 calculates a reference display size at the intersection (step S33).

The drawing controller 54 calculates the display reference size corresponding to the distance from the position of the equipped vehicle and the intersection, for example.

The drawing controller 54 sets a vertical offset value of the guide figure based on the scaling of the display reference size and the difference in altitude (step S34).

The drawing controller 54 sets a vertical offset value based on the distance between the position of the equipped vehicle and the intersection and the difference in altitude between the same and then terminates the altitude difference correction process.

Back to FIG. 6, the navigation device 1 displays the guide figure and the like on the first display unit 10 (step S17).

The drawing controller 54 draws the guide figure created in the step S15 at the corresponding position on the combiner 10b at which the facility is seen from the equipped vehicle. In this process, when the vertical offset value is set in the altitude difference correction process, the drawing controller 54 eliminates the difference in altitude and draws the guide figure at the corresponding position on the combiner 10b.

The drawing controller 54 creates the direction symbol indicating the direction of turn (deviation) at the intersection and draws the created symbol on the combiner 10b.

Specifically, the drawing controller 54 draws the guide figure G and direction symbol S on the combiner 10b as illustrated in FIGS. 5B and 5C.

As described above, the guide figure G hatched with diagonal lines is actually drawn in a predetermined translucent color (yellow, for example). The guide figure G is created to have the same profile shape as that of the facility as the reference point which is seen from the equipped vehicle and have a size corresponding to the distance to the facility. The guide figure G is then drawn at such a position that the guide figure G is seen on the facility from the equipped vehicle through the combiner 10b. The driver can therefore directly recognize the facility serving as the reference point based on the guide figure G and the view of the facility seen through the guide figure G.

The apparent size of the facility changes as the equipped vehicle moves. Accordingly, the guide figure G is drawn so as to keep up with the change.

As described above, the direction symbol S is also drawn on the combiner 10b in size corresponding to the distance to the intersection.

Accordingly, the driver can easily know the suggested intersection and the direction of turn based on the guide figure G and direction symbol S drawn on the combiner 10b.

Back to FIG. 6, the navigation device 1 determines whether the equipped vehicle has reached the destination (step S18).

When determining that the equipped vehicle has not reached the destination yet (step S18; No), the navigation device 1 returns to the step S11 and repeatedly executes the processes of the aforementioned steps S11 to S18.

When determining that the equipped vehicle has reached the destination (step S18; Yes), the navigation device 1 terminates the navigation process.

By the above-described navigation process, the guide figure G indicating the facility serving as the reference point and the direction symbol indicating the direction of turn (deviation) are drawn on the combiner 10b when the equipped vehicle nears the intersection for which guidance is needed.

Accordingly, the driver can easily know the suggested intersection and the direction of turn from the landscape including the combiner 10b.

The navigation device 1 can properly inform the driver of an intersection for which guidance is needed.

Modification of First Embodiment

The above first embodiment is described using a right-hand drive vehicle as an example. However, the embodiment is properly applicable to a left-hand drive vehicle.

When the navigation device 1 is mounted in a left-hand drive vehicle, the first display unit 10 is properly adjusted and located on the ceiling above the left steering wheel in the same manner as described above.

Figure 9:
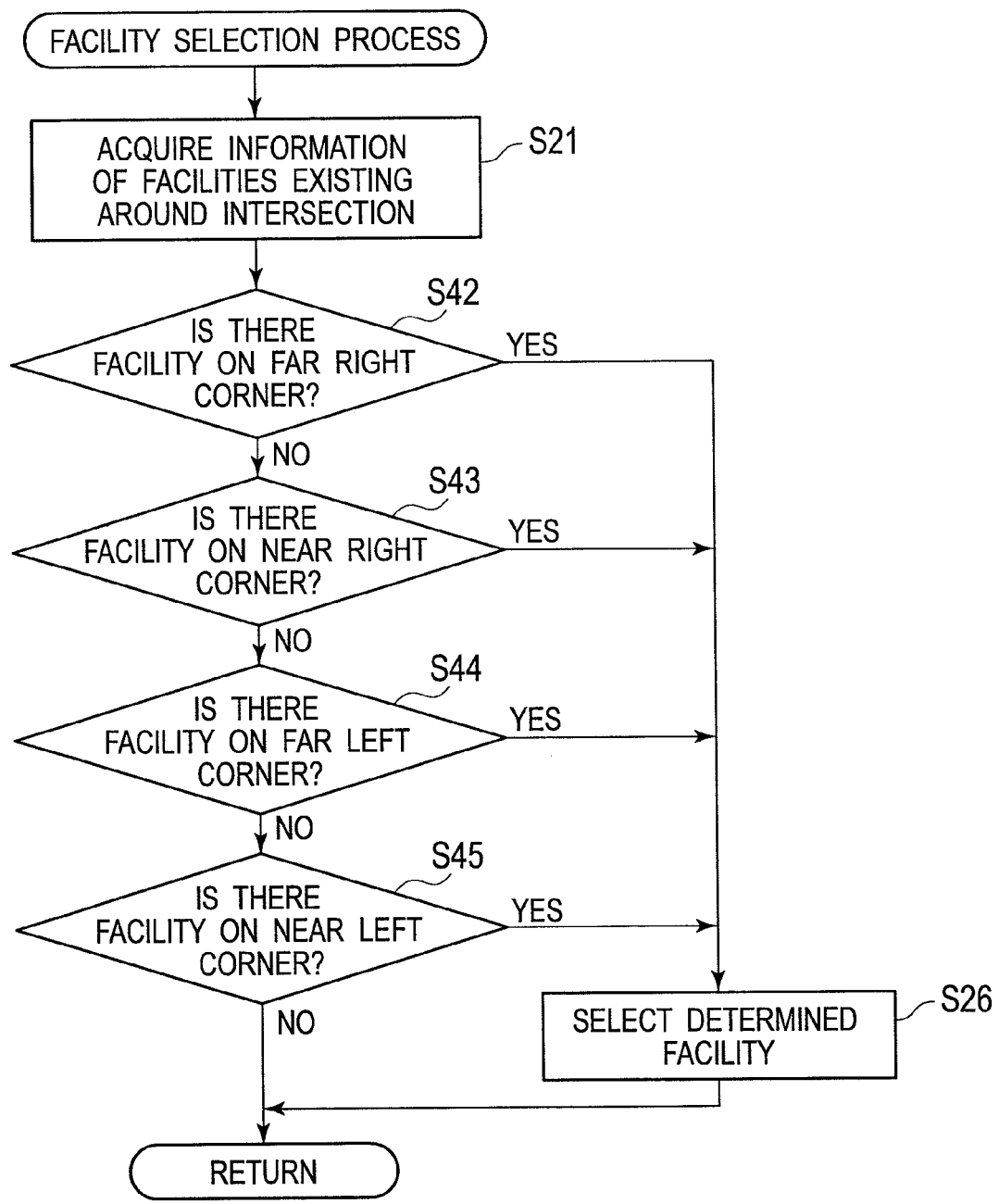
FIG. 9 is a flowchart showing the details of a facility selection process according to a modification of the first embodiment by way of example.

In the case of the left-hand drive vehicle, the facility selector 53 executes a facility selection process shown in FIG. 9 instead of the above-described facility selection process of FIG. 7.

As shown in steps S42 to S45 of FIG. 9, the priorities for selecting a facility are different from those of the case of a right-hand drive vehicle. In the case of a left-hand drive vehicle, the facilities are prioritized based on the positions in the order of: the far right corner, near right corner, left far corner, and left near corner with respect to the equipped vehicle.

This is because the user can more easily understand the guidance to turn before a facility than the guidance to turn after passing by the facility. Moreover, in the case of a left-hand drive vehicle, the driver can recognize more easily the right side of the landscape which is closer to the center of the front of the vehicle.

Accordingly, in the case of the aforementioned example of FIG. 4, the facility selector 53 selects a facility T3 which is located at the far right corner and is of the highest priority. The facility selector 53 selects a facility of higher priority based on the existence of each facility at the intersection: when the facility T3 does not exist, the facility selector 53 selects the facility T4, which is of the second highest priority, in the similar manner which is in the right-hand drive vehicle.

The above operation is performed for the crossroads at which two roads intersect. In the case of a Y-junction or an intersection at which three or more roads intersect, facilities are properly prioritized, and the facility selector 53 selects a facility of a higher priority corresponding to each intersection for which guidance is needed.

Also in the case of the left-hand drive vehicle, the navigation device 1 displays the guide figure G indicating the facility serving as the reference point and the direction symbol S indicating the direction of turn (deviation) on the combiner 10b when the equipped vehicle nears the intersection for which guidance is needed.

Accordingly, it is possible to easily know the suggested intersection and direction of turn from the landscape including the combiner 10b in a similar manner even when the equipped vehicle is a left-hand drive vehicle.

In the first embodiment described above, the description is given of the case where the combiner 10b is located at the upper center of the driver's field of vision as illustrated in FIG. 3A. The position of the combiner 10b in the field of vision is not limited to the aforementioned upper center and can be changed properly. For example, if the combiner 10b is not allowed to be located at the upper center of the field of vision by laws and regulations, the combiner 10b may be provided to the right or left side of the upper center.

Figure 10A:
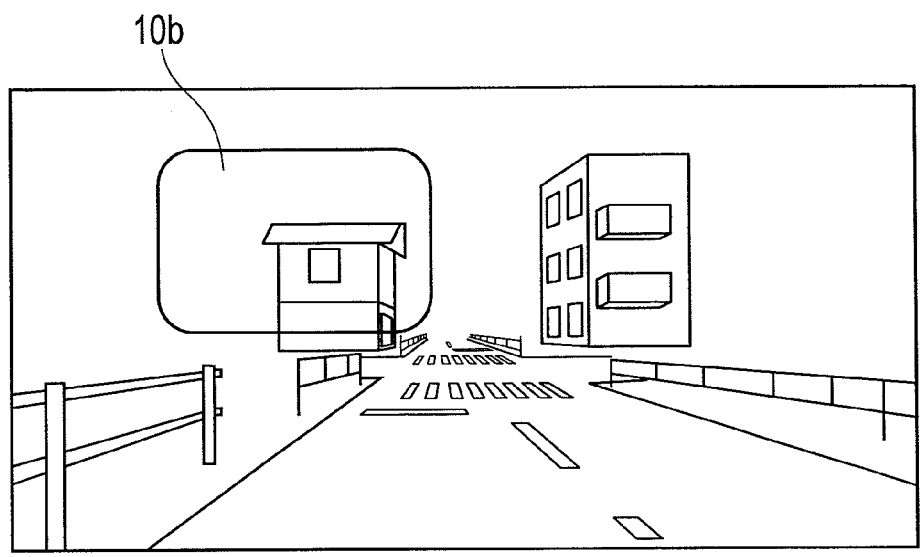
FIG. 10A is a schematic view for explaining that the combiner is held in the upper left side of the driver's field of vision.
Figure 10B:
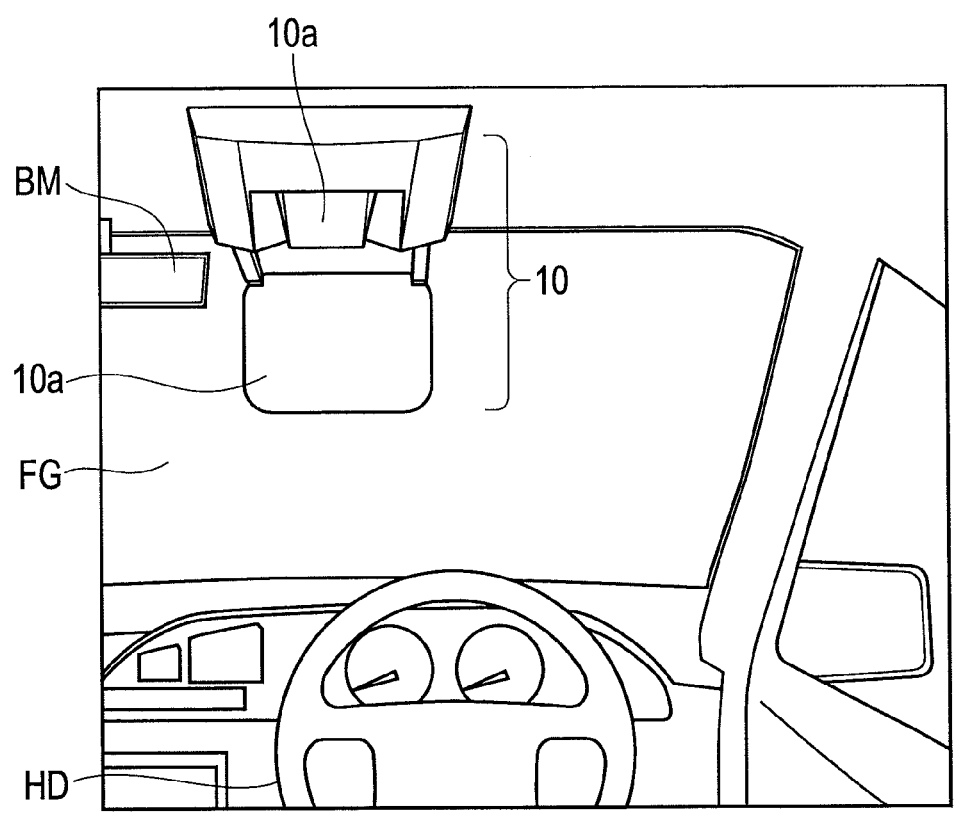
FIG. 10B is a schematic view for explaining a concrete installation place of the first display unit in the case of FIG. 10A.

The combiner 10b may be provided in the upper left side of the driver's field of vision as illustrated in FIG. 10A, for example. In this case, in the first display unit 10, the body (the projector 10a or the like) is fixed to the rearview mirror BM side of the steering wheel HD on the ceiling within the equipped vehicle, and the combiner 10b is located substantially to the right of the rearview mirror BM.

When the combiner 10b is provided in the upper left side of the driver's field of vision as illustrated in FIG. 10A, the facilities in the right side of the front field of vision (that is, to the right side of the intersection) are out of the combiner 10b.

Accordingly, the facility selector 53 skips (does not execute) the steps S24 and S25 in the aforementioned facility selection process of FIG. 7. In other words, the priorities for selecting a facility are determined so that the facilities are prioritized in the order of positions: the far left corner and near left corner with respect to the equipped vehicle.

In the above case, it is premised that there is a facility in the left side of the front field of vision (that is, to the left side of the intersection). However, in a similar manner to the above-described operation, the navigation device 1 displays the guide figure G indicating the facility serving as the reference point and the direction symbol S indicating the direction of turn (deviation) when the equipped vehicle nears the intersection for which guidance is needed.

Accordingly, the driver can easily know the suggested intersection and the direction of turn even in the case where the combiner 10b is located in the upper left side of the driver's field of vision.

Second Embodiment

In the description of the above first embodiment, the combiner 10b is located in upper part (upper center, upper left side, or the like) of the driver's field of vision. However, the installation position of the combiner 10b in the field of vision is not limited to upper part and can be properly changed. For example, the combiner 10b may be located in a lower part of the field of vision.

In the description of the above first embodiment, the facility serving as the reference point is selected, and the guide figure indicating the selected facility is displayed on the combiner 10b. However, the reference point is not limited to such a facility and may be another object. For example, a guide figure indicating a lane selected from a plurality of lanes may be drawn on the combiner 10b.

Hereinafter, a description is given of a navigation device 2 according to a second embodiment of the present invention characterized as described above with reference to the drawings.

Figure 11:
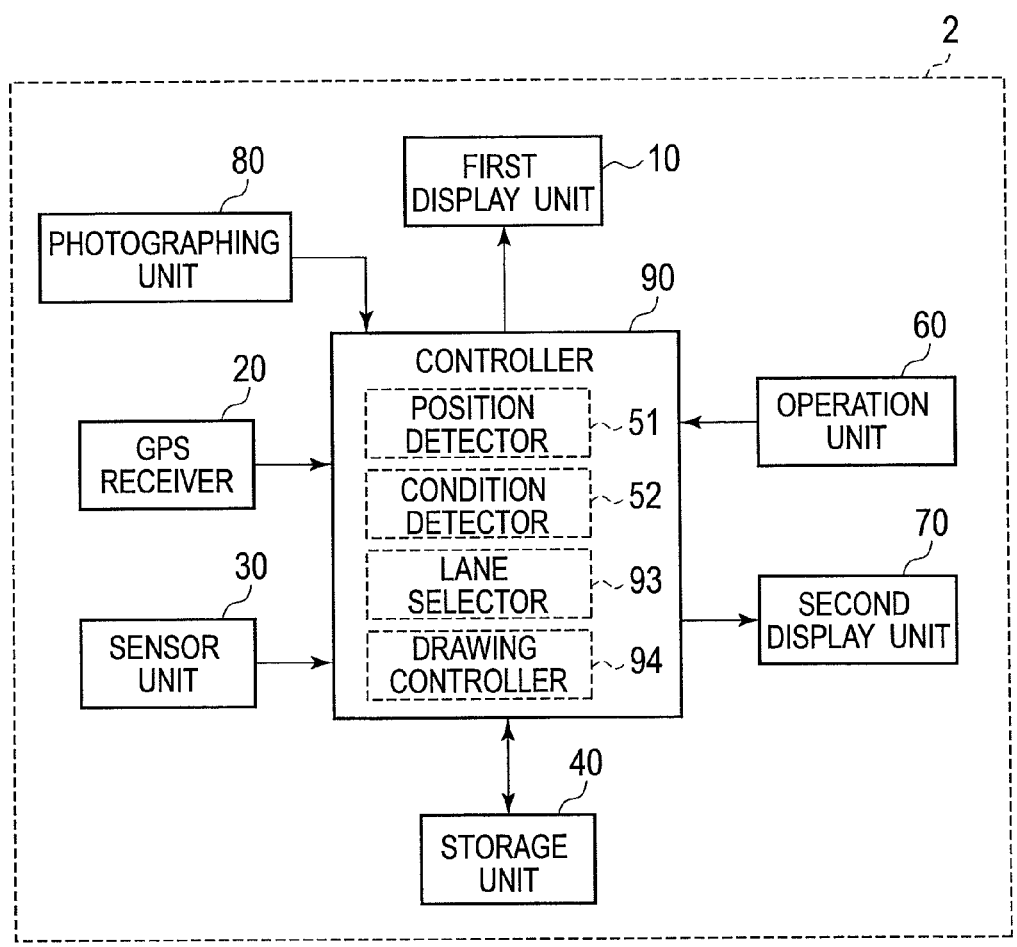
FIG. 11 is a block diagram illustrating a configuration example of a navigation device according to a second embodiment.

FIG. 11 is a block diagram illustrating a configuration example of the navigation device 2 according to the second embodiment of the present invention.

As illustrated in the drawing, the navigation device 2 includes a first display unit 10, a photographing unit 80, a GPS (global positioning system) receiver 20, a sensor unit 30, a storage unit 40, a controller 90, an operation unit 60, and a second display unit 70.

The navigation device 2 according to the second embodiment further includes the photographing unit 80 in the configuration of the navigation device 1 according to the above-described first embodiment. Furthermore, the controller 50 of the navigation device 1 is replaced with the controller 90. The configuration of the navigation device 2 is the same as that of the navigation device 1 other than the photographing unit 80 and controller 90.

Figure 12A:
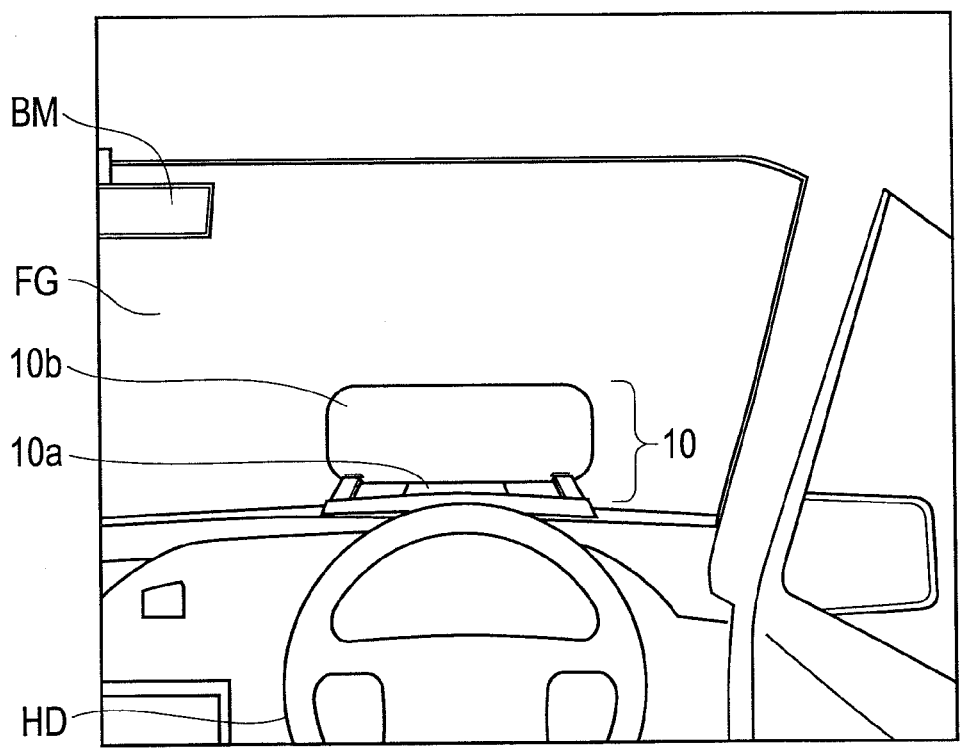
FIG. 12A is a schematic view for explaining a concrete installation place of the first display unit in the second embodiment.

Herein, as illustrated in FIG. 12A, the body (a projector 10a or the like) of the first display unit 10 is fixed on a dashboard behind the steering wheel HD, and the combiner 10b thereof is provided in the vicinity of the windshield FG.

Figure 12B:
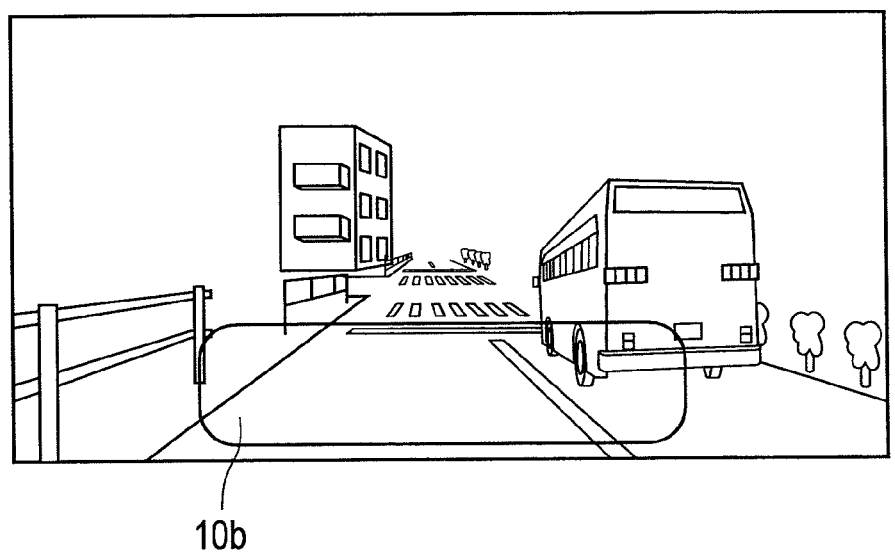
FIG. 12B is a schematic view for explaining that the combiner is held at the lower center of the driver's field of vision.

As illustrated in FIG. 12B, the first display unit 10 is properly adjusted and located so that the combiner 10b is held at the lower center of the field of vision of the driver who is looking at the front.

Back to FIG. 11, the photographing unit 80 is composed of a CCD (charge coupled device) camera or the like and is configured to take an image of the landscape in front of the vehicle on which the navigation device 2 is mounted, that is, the driver's front field of vision.

For example, the photographing unit 80 is provided on the rear side of the rearview mirror BM illustrated in FIG. 12A described above and is adjusted to correspond to the driver's line of sight (the front field of vision). The installation position of the photographing unit 80 can be properly changed. For example, the photographing unit 80 may be located near the first display unit 10 on the dashboard and adjusted to correspond to the driver's front line of sight.

The front landscape photographed by the photographing unit 80 includes the road (the road ahead) that the vehicle is traveling. The photographing unit 80 therefore sequentially supplies the photographed images of the landscape including the road.

Similarly to the controller 50 according to the first embodiment, the controller 90 is composed of a microcomputer including a ROM, a RAM, and a CPU, and the like and is configured to control the entire navigation device 2. Specifically, the CPU reads and executes programs stored in the ROM to cause the controller 90 to function as a position detector 51, a condition detector 52, a lane selector 93, and a drawing controller 94.

The position detector 51 and condition detector 52 have the same configurations as those of the aforementioned controller 50. The controller 90 also retrieves a navigation route from the road network information of the storage unit 40 and stores the same in the storage unit 40 when a desired destination is set by the operation unit 60 in a similar manner to the controller 50.

The lane selector 93 selects a lane that the equipped vehicle is to travel in the road included in the landscape photographed by the photographing unit 80 when the equipped vehicle nears an intersection for which guidance is needed along the navigation route, that is a crossroads at which the equipped vehicle needs to turn right or left or a junction at which the equipped vehicle needs to deviate right or left.

Figure 13A:
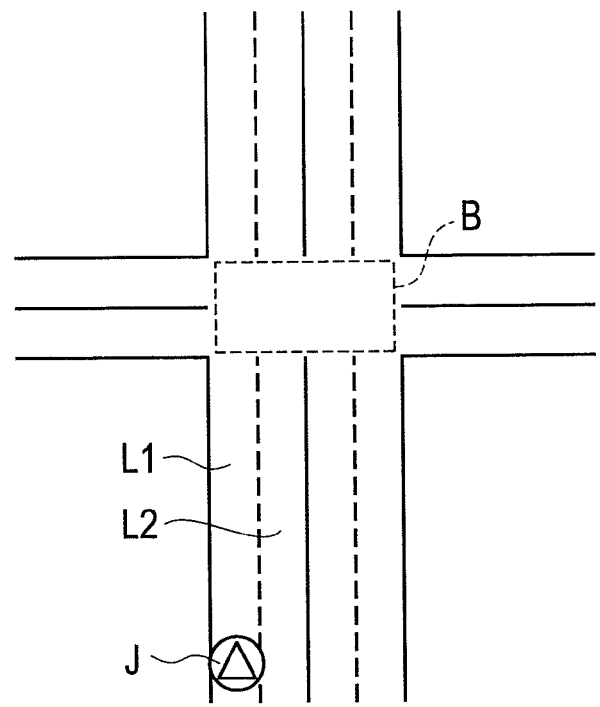
FIG. 13A is a schematic view for explaining about lanes of a road leading to a certain intersection.

Specifically, when an equipped vehicle J traveling a road including two lanes L1 and L2 (two lanes in each way) nears an intersection B for which guidance is needed as illustrated in FIG. 13A, the lane selector 93 analyzes the image of the landscape photographed by the photographing unit 80 to determine the number of lanes and the lane that the equipped vehicle is traveling (driving lane).

For example, the lane selector 93 determines the number of lanes of the road that the equipped vehicle is traveling based on fences and shrubbery outside of the road, lanes and signs on the road, the forward directions of other vehicles, and the like. The lane selector 93 may be configured to read the number of lanes of the road that the equipped vehicle travels before reaching the intersection B from the storage unit 40.

The lane selector 93 determines the lane that the equipped vehicle is traveling by sequentially detecting lane changes of the equipped vehicle (crossing lane lines).

The lane selector 93 selects a lane according to the direction of turn (deviation) at the intersection B. Specifically, the lane selector 93 selects a lane L1 when the equipped vehicle is to turn left at the intersection B and selects a lane L2 when the equipped vehicle is to turn right.

Back to FIG. 11, the drawing controller 94 creates a guide figure indicating the lane serving as the reference point and draws the created figure on the first display unit 10.

The drawing controller 94 creates a guide figure indicating the lane selected by the lane selector 93 and draws the guide figure at the corresponding position on the combiner 10b so that the guide figure is seen on the lane.

For example, the drawing controller 94 calculates the shape and size of the lane serving as the reference point seen through the combiner 10b and creates a guide figure based on the calculated shape and size. The drawing controller 94 draws the guide figure at the corresponding position on the combiner 10b at which the lane is seen from the equipped vehicle.

Moreover, the drawing controller 94 creates a direction symbol indicating the direction of turn (deviation) at the intersection and draws the created figure on the combiner 10b.

Figure 13B:
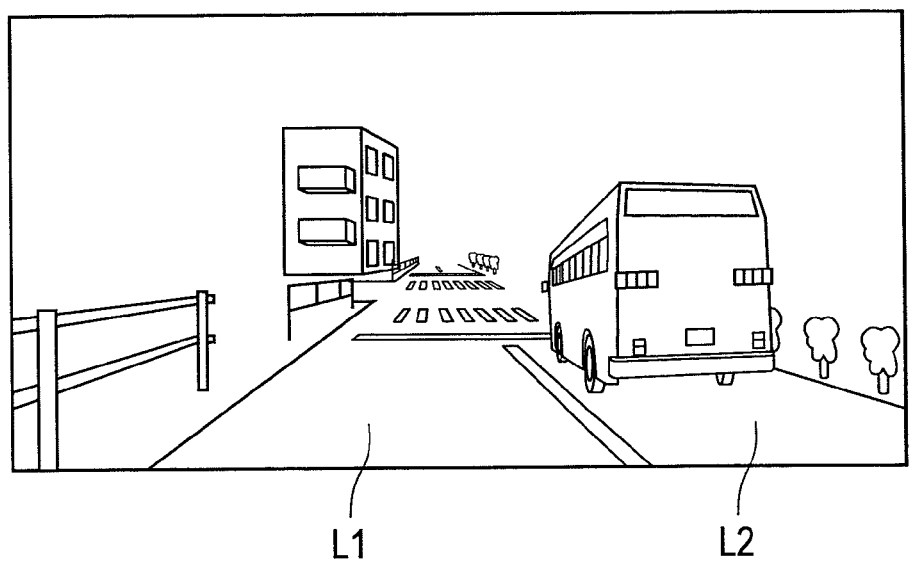
FIG. 13B is a schematic view for explaining an example of landscape photographed by a photographing unit.
Figure 14:
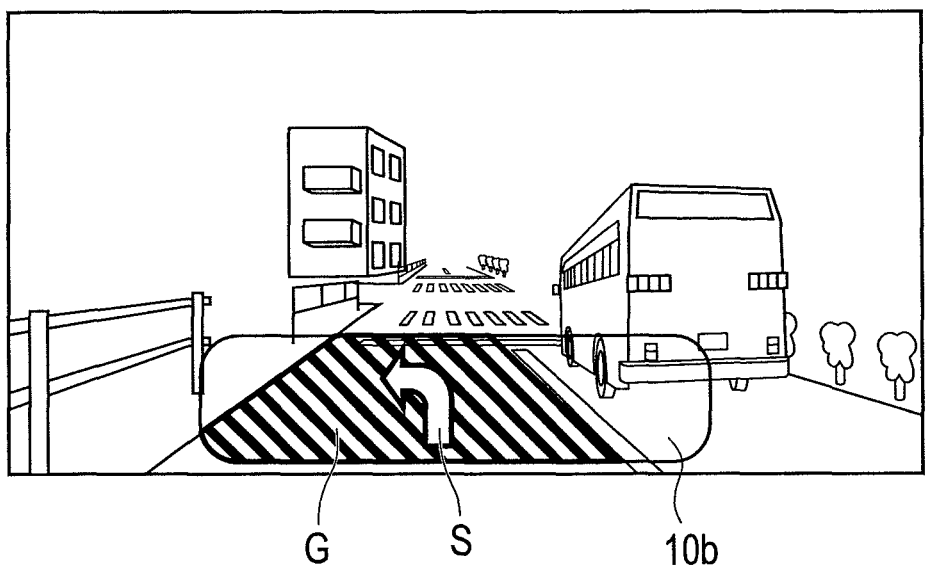
FIG. 14 is a schematic view for explaining a guide figure, a direction symbol, and the like which are drawn on the combiner.

Specifically, when the lane L1 illustrated in FIG. 13B is selected as the reference point (when a vehicle J is to turn left at an intersection B in FIG. 13A), the drawing controller 94 projects the guide figure G as illustrated in FIG. 14 onto the combiner 10b.

The guide figure G, which is hatched with diagonal lines in FIG. 14, is actually drawn in a predetermined translucent color (yellow, for example).

The guide figure G is projected at such a position that the guide figure G is overlaid on the lane (the lane L1 of FIG. 13B) serving as the reference point and can be seen through the combiner 10b from the equipped vehicle. The driver can therefore directly recognize the road serving as the reference point based on the guide figure G and the road seen through the guide figure G.

The drawing controller 54 creates the direction symbol S indicating the direction that the equipped vehicle is to turn (a direction symbol for left turn in the case of this example) in size corresponding to the distance to the intersection and draws the same on the combiner 10b. In other words, the drawn direction symbol S enlarges as the equipped vehicle nears the intersection.

Accordingly, the driver can easily know the suggested intersection (the intersection ahead in this example) and the direction of turn (left turn in this example) based on the guide figure G and direction symbol S thus drawn on the combiner 10b.

The navigation device 2 according to the second embodiment can properly inform the driver of the intersection for which guidance is needed.

Modification of Second Embodiment

In the description of the second embodiment, the navigation device 2 includes the photographing unit 80 and analyses an image of the front landscape taken by the photographing unit 80 to select the lane that the equipped vehicle is to travel. However, the lane may be selected in a configuration not including the photographing unit 80.

For example, the lane selector 93 determines the lane that the equipped vehicle is traveling based on the relationship between the current position of the equipped vehicle and lane information (including the number of lanes of each road link) of the map information stored in the storage unit 40. The lane selector 93 may select any lane in a similar manner to the above description according to the direction of turn along the navigation route.

In the description of the second embodiment, as illustrated in FIG. 12B, the combiner 10b is located at the lower center of the driver's field of vision. The place where the combiner 10b is located in the field of vision is not limited to the lower center and can be properly changed.

For example, if the combiner 10b is not allowed to be located at the lower center of the field of vision by laws and regulations, the combiner 10b may be provided to the right or left side of the center similarly to the modification of the first embodiment.

Other Modifications

In the first and second embodiments, the guide figure and the like are drawn on the combiner 10b for guidance at an intersection but also may be drawn for guidance of other objects.

For example, in order to guide a facility at the destination or a stop, the drawing controller 54 or the like draws a translucent guide figure indicating the facility on the combiner 10b in a similar manner to the above description. In this process, the drawing controller 54 or the like may emphasize the guide figure of a facility at the destination or stop by displaying the guide figure in a different translucent color or displaying the name of the facility.

In the first and second embodiments, the description is given of the navigation devices 1 and 2 mounted in vehicles. Furthermore, the first and second embodiments are also properly applicable to moving bodies other than vehicles.

For example, the first and second embodiments are applicable to navigation devices for guiding walkers and the like. In this case, the first display unit 10 is composed of a wearable display attached to eye glasses, a head-mounted display, or the like and is used on the walker.

According to the first and second embodiments, it is possible to properly inform a walker or the like of an intersection for which guidance is needed in a similar manner in this case.

As described above, it is possible to properly show an intersection for which guidance is needed according to the embodiments.

What is claimed is:

1. A navigation device comprising: a position detector configured to detect a current position of a moving body; a condition detector configured to detect moving conditions including a forward direction of the moving body;

a display unit configured to display on a head-up display a predetermined image overlaid on the view of the landscape in front of the moving body;

a storage unit configured to store the position of each intersection in a route along which the moving body moves and the position and shape of each stationary object existing around each intersection at the point when the objects were stored;

a selector configured to select only one of the objects existing around an intersection for which guidance is needed when the moving body nears the intersection; and a drawing controller configured to draw on the display unit, a guide figure indicating the object selected by the selector, wherein the drawing controller draws the guide figure so that the guide figure is seen on a head-up display on the corresponding object in the view of the landscape in front of the vehicle, based on the current position detected by the position detector, the moving condition detected by the condition detector, and the position and shape stored in the storage unit for the object selected by the selector;

the selector selects the objects based on priorities determined according to a positional relationship between the moving body and each object around the intersection for which guidance is needed, the priorities being set so that the objects located on a far side of the intersection for which guidance is needed have a higher priority and the objects located on a near side of the intersection for which guidance is needed have a lower priority with respect to the position of the moving body.

2. The navigation device according to claim 1, wherein the drawing controller draws the guide figure at a display position which is corrected based on a difference in altitude between the current position of the moving body and the position of the intersection for which guidance is needed.

3. The navigation device according to claim 1, wherein the moving body being either one of a right-hand drive vehicle or a left-hand drive vehicle, the selector selects only one of the objects based on priorities which are set so that the objects located on a left side have a higher priority and the objects located on a right side have a lower priority with respect to the position of the right-hand drive vehicle, and that the objects located on the right side have a higher priority and the objects located on the left side have a lower priority with respect to the position of the left-hand drive vehicle.

4. A display control method for a navigation device with a processor comprising:

detecting a current position of a moving body;

detecting moving conditions including a forward direction of the moving body;

selecting only one of objects existing around an intersection for which guidance is needed when the moving body nears the intersection, based on priorities determined according to a positional relationship between the moving body and each object around the intersection, the priorities being set so that the objects located on a far side have a higher priority and the objects located on a near side have a lower priority with respect to the position of the moving body, wherein a storage medium is configured to store the position of each intersection and the position and shape of each stationary object existing around each intersection at the point when the objects were stored; and drawing a guide figure indicating the selected object on a head-up display unit so that the guide figure is overlaid on the view of the landscape in front of the moving body, and that the guide figure is seen on the corresponding object in the landscape in front of the vehicle, based on the current position of the moving body, the moving condition of the moving body, and the position and shape for the selected object.

5. The display control method according to claim 4, wherein the moving body being either one of a right-hand drive vehicle or a left-hand drive vehicle, the priorities are set so that the objects located on a left side have a higher priority and the objects located on a right side have a lower priority with respect to the position of the right-hand drive vehicle, and that the objects located on the right side have a higher priority and the objects located on the left side have a lower priority with respect to the position of the left-hand drive vehicle.

* * * * *